United States Patent [19]

Steele

[11] Patent Number: 5,103,355
[45] Date of Patent: Apr. 7, 1992

[54] SYSTEM FOR CORRELATING HEAD SCAN TRACKING AND TAPE TIMER TRANSITIONS

[75] Inventor: Robert B. Steele, Menlo Park, Calif.

[73] Assignee: Ampex Corporation, Redwood City, Calif.

[21] Appl. No.: 336,182

[22] Filed: Apr. 11, 1989

[51] Int. Cl.$^5$ .................. G11B 5/588; G11B 27/10
[52] U.S. Cl. ..................... 360/77.13; 360/10.2; 360/14.2
[58] Field of Search .................. 360/8-10.3, 360/22, 13-14.3, 64, 70, 73.05, 73.08, 73.11, 77.12-77.17, 78.02, 11.1, 77.01; 358/312, 321

[56] References Cited

U.S. PATENT DOCUMENTS 4,393,416 7/1983 Takeuchi et al. .................. 360/10.2
4,692,819 9/1987 Steele .

OTHER PUBLICATIONS

Television Engineering Handbook, McGraw Hill Book Co., 1986, Benson, pp. 15.115–15.122.
Ampex Corporation VPR-3 Video Tape Recorder Operational Manual, 1809594-04, Feb. 1988, pp. 5-15 to 5-25.

Primary Examiner—Aristotelis Psitos
Assistant Examiner—Steven R. Garland
Attorney, Agent, or Firm—George B. Almeida

[57] ABSTRACT

A scan tracking centering algorithm is not left at a nominal value, but is modified based on a tape timer's position into the field. That is, the scan tracking centering is adjusted forward (i.e., down) if the tape timer indicates the tape position is early in the field, and is adjusted back (i.e., up) if the indicated tape position is late in the field. Thus, the head deflection control decision which determines if the jumps, or doesn't jump, is made dependent upon tape position in the field, as well as on head elevation.

17 Claims, 4 Drawing Sheets

FIG. 2A (IDEAL)

SYSTEM FOR CORRELATING HEAD SCAN TRACKING AND TAPE TIMER TRANSITIONS

BACKGROUND AND SUMMARY OF THE INVENTION

The invention relates to the playback of video signals and, more particularly, to the control of a scan tracking head jump process with field accuracy during stop and selected variable playback processes, utilizing tape position information derived from a tape timer.

The field accuracy of a video tape recorder in modes other than the play mode, is affected by the properties and eccentricities of a controllable scan tracking head system. For example, when the video tape recorder operates at selected velocities or in stop mode, the tracking offset due to the interchange problems between recording tapes and video tape recorders, will produce regions of the recording tape that will be misslabeled because the scan tracking head has made its jump prior to the indication of a field transition by the tape timer, or it makes its jump sometime after the tape timer indicates a field transition. That is, in tracking systems that do not include vertical interval time code, or tape timers correlated with the color field identifying inputs, the associated video tape recorder fails to include means which insures that the scan tracking head jump decisions are made precisely at the occurrence of a field-to-field transition. Thus the tape timer may identify one field as the video signal output when, in fact, the head may be tracking a portion of a preceding or subsequent field.

Such a condition is particularly disadvantageous when determining, for example, an insert or assemble edit, where it is imperative that the edit be made precisely at the selected field. In type C recorders, and even in the latest digital video tape recorder systems, editing is often done by first marking the field of desired content as identified visually via a video monitor and by the tape timer. Very often this is done at velocities other than play to ease the decision process. Then the edit is rehearsed and/or made using the same tape timer readout. However, due to the fact that the track jump decision made by the track jump logic of the scan tracking head is responsive only to its elevation, at the precise moment of the edit marking the tape timer may have been indicating an adjacent, improper field rather than the proper field being shown by the video monitor. That is, due to the inconsistency in the head jump control, there is no assurance that the desired field marked for the edit is the same as the field labeled by the tape timer. This condition is undesirable when selecting edit points.

Typical of a system for overcoming the above mentioned problem of incorrectly identifying and/or parking at an incorrect field, such as when searching to an edit entry point, is a system such as used, for example, in a conventional type C or digital video tape recorder. In effect, such a system provides means for holding, or advancing, the reporting of the tape position in response to the control of the scan tracking head from one field to another, while the algorithm for centering the head is maintained at a fixed nominal value. That is, the system basically extracts off-tape information and particularly, extracts the color field identification signal such as generated by a conventional color field 1 detector circuit. With this information available, the field-to-field transitions are known, and the system only allows the tape timer to indicate a new field when the head jump control initiates the signal to advance the tape timer. Therefore, the head jump decision, and thus the field transition appears simultaneous with a field transition of the timer.

In a vertical interval time code (VITC) system, the time code is taken from off-tape and, in effect, from the helical scan mechanism. As the helical scan rotates, it advances to a new field whereby the system reads and reports the occurrence of a new field. The information is obtained during the vertical sync interval and thus is available for updating the time code prior to its display during active video. Such systems of course require that the vertical interval time code be available and correlated with longitudinal time code.

The present invention overcomes the disadvantages of the systems of previous mention, while providing a technique and apparatus for coinciding the scan tracking head movement command with the transition between fields, that is, with the indication of a new field by the tape timer.

To this end, the algorithm for centering the scan tracking head is not left centered at nominal in conventional manner, but continuously is adjusted in response to the tape timer's position within the field. That is, the centering of the scan tracking head is biased forward (or down) when the tape timer indicates that the tape position is early in the field. Or the centering is biased back (or up) when the tape timer indicates the tape position is late in the field. In effect, the scan tracking head is given a shifted scan tracking elevation envelope, which is skewed relative to the nominal center elevation in response to tape position information. The resulting expanded field elevation envelope requires a corresponding increase in the amount of head deflection proportional to the tracking error, but within traditional scan tracking capabilities. As a result a head jump decision and thus a field transition always is made coincident with the tape timer's indication of a transition to the next field. Since the head now always is reading out the proper field, there is no disagreement between the field being scanned and the tape timer readout, and thus there no longer is a region of disagreement between the output video and the tape timer readout.

More particularly, a tape timer system is supplied with control track and capstan tach information and also, if desired, with time code information, in generally conventional fashion. The tape timer system in turn generates a tape timer output signal indicative of tape position in units of hours, minutes, seconds, frames, fields and capstan tachs. A capstan tach residual signal derived from the capstan tach signal of the tape timer output signal, together with a tape velocity signal, is used in a head centering algorithm of the invention, to provide a head centering signal whose value continuously is modified in response to the tape position as represented by the capstan tach residual signal, as well as the tape velocity signal. At such time as a field-to-field transition occurs, and only at such time, the head is allowed to transition to obtain the desired scan track. In effect, the scan tracking head centering is biased with a continuously modified value, which value is proportional to how far through the field the tape has traveled. By way of example only, the algorithm is expressed herein as; centering=½f-capstan tach residual, if $-1/6 \leq$ velocity $\leq 1/6$, where f is a field of deflection corresponding to the distance between tracks, and the value 1/6 is relative to normal tape speed around stop. However, the invention may be used in the velocity range of the order of from −1/6 through 2 1/6 normal play speed. If the velocity is not within the selected velocity range, the centering algorithm is centered on zero with ±⅓f tolerance in the manner of the traditional system of scan tracking control.

Although the invention generally is described herein in the environment of a helical non-segmented video recording format, it may be used in helical segmented systems and/or in helical instrumentation recording systems other than video, as further discussed hereinafter.

DESCRIPTION OF THE PREFERRED EMBODIMENTS

For clarity of illustration, the present invention is described herein in the environment of a non-segmented helical video recording system, but it is to be understood that the invention applies equally to a helical segmented video system, and/or to a helical instrumentation recording system format. That is, although the invention is exemplified herein with one field recorded per helical track, it contemplates use wherein one field may be recorded in more than one track, or portions of tracks, using more than one head such as, for example, in the segmented, dual azimuth head format employed in current digital video tape recorders. In a such segmented format, a field may be selectively recorded in multiple tracks, with multiple heads. In addition, there are recording systems such as instrumentation recording systems, wherein data is arranged in a logical grouping, for example, a selected interval of helical data. Thus, although the term "field" is used herein as descriptive of a field of video, which is recorded in a single helical track in the conventional type C format, it is to be understood that the term "field" is more broadly intended to represent, for example, a logical grouping of helical tracks (of data). For example, in the instrumentation recording system, since there are no fields, the data is arranged and recorded in a logical grouping of helical tracks. The invention is equally adapted to insuring that the head scan tracking (of one or more heads) is correlated to the tape timer transitions, regardless of the number of heads, the number of tracks and/or the recording arrangement of a field into the tracks.

In addition, the term "head jump" is loosely used herein to also include the action of not causing the head to jump but to instead allow the conventional ramping of the head to proceed to obtain the next track. It is to be understood that the conventional head ramp deflection mechanism is always operating, and that the jump deflection mechanism operates in conjunction therewith. Thus "head jump" as used herein, is intended to mean a head logic decision which generally determines whether the head jumps or is allowed to proceed to the next track as determined by the conventional ramp deflection mechanism.

Figure 1A:
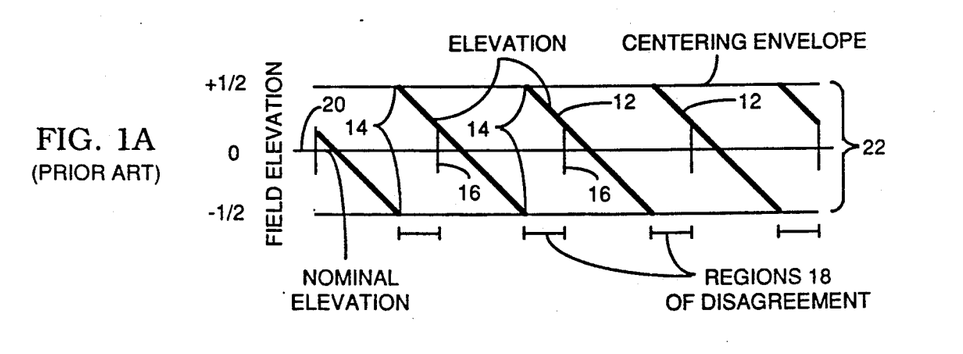
FIG. 1A is a graph depicting the relationship between traditional scan tracking centering and tape position in the presence of a tracking error indicated by a tape timer.
Figure 1B:
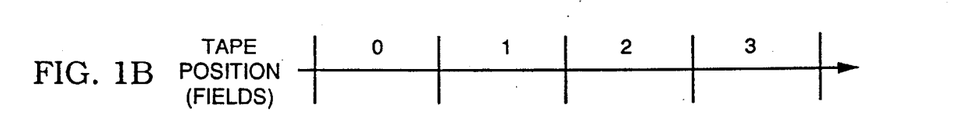
FIG. 1B is a scale depicting the tape timer tape position relative to FIGS. 1A and 1C.

Referring now to FIG. 1A, a graph depicts a traditional algorithm for providing a nominal elevation within a constant centering envelope, for supplying scan tracking centering relative to tape position as represented by a tape timer system, for typical controllable scan tracking systems. The vertical axis represents the scan tracking center elevation, i.e., the field elevations at the middles of each scan. These scans in turn are depicted and described relative to time in FIGS. 2A–2E. In FIG. 1A, the horizontal axis represents tape position as indicated by a tape timer signal. The head elevation corresponding to a fixed nominal centering is depicted at 20, and the centering envelope is identified by numeral 22. For illustration, the representation assumes a one-sixth (1/6) normal play speed tape motion condition, and one-third (⅓) of a field of tracking error. The tracking error is exaggerated herein for clarity of presentation and to facilitate the description. The head center elevations for successive fields are depicted by the sloping heavy lines 12, while the time of occurrence of the transitions between tape timer fields is depicted by the vertical light lines 16 which correspond to the tape position, in fields, of FIG. 1B. As illustrated in FIG. 1A, in prior art systems, the scan tracking transition to the next field is indicated at numeral 14 by the transition of the head center elevation, when the center elevation reaches ±½ track of error. As may be seen, in the presence of the tracking error illustrated herein, when moving in the forward direction, the jump is made before the tape timer indicates a transition from one field to the next at 16. Thus, in the regions 18 corresponding to output video/tape timer disagreement, the head begins scanning a new field while the tape timer signal continues to represent the same previous field. In the reverse direction, the head continues to scan the same field while the tape timer signal represents a subsequent field.

That is, due to the tracking error, the transitions 16 from one field to the next as represented by the tape timer signal, are not coincident with the scan tracking head jump at the end of one field and the beginning of the next, as indicated by the numerals 14. Thus, in the regions of disagreement 18, the head is scanning one field but the tape timer signal is indicating a different field. Or vice versa, the tape timer indicates the tape position is in one field, but the head is actually outputting a video signal generated by an adjacent field. Thus, the head jump may occur prior to, or after, the tape timer field-to-field transition. Note that the lines 12, which correspond to the locus of head elevation for each head scan center, are bisected by the nominal elevation 20 for each field interval. In addition, the head displacement is limited to ±½ field relative to the nominal elevation 20. As may be seen, the centering envelope is constant, with the optimal elevation varying symmetrically from $+\frac{1}{2}$ track to $-\frac{1}{2}$ track relative to the nominal elevation.

Figure 1C:
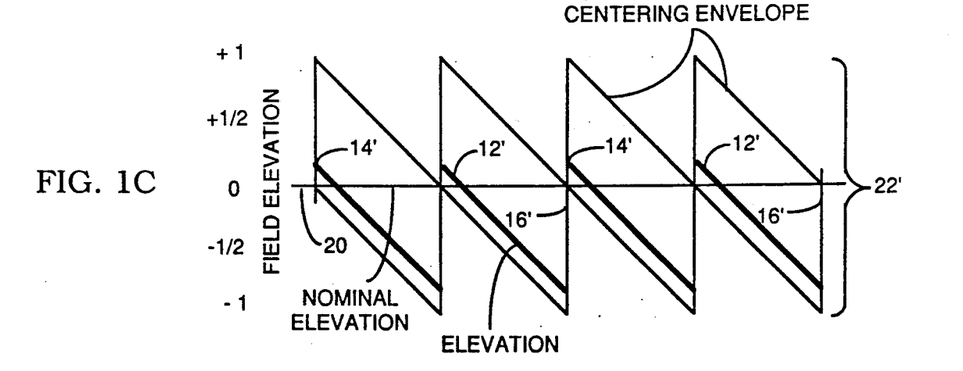
FIG. 1C is a graph depicting the invention's technique for adjusting the scan tracking centering envelope to allow coinciding the occurrence of a head jump with a transition between fields as indicated by tape position.

FIG. 1C depicts the head centering algorithm of the invention, which provides for continuously adjusting or biasing, the scan tracking centering in response to the tape position; that is, in response to the location of the tape as it moves through a field. The graph again assumes a speed of 1/6 play speed and a $\frac{1}{3}$ field of tracking error. Similar elements of FIGS. 1A, 1C are similarly numbered, with FIG. 1C including a prime symbol on similar numerals to indicate a modified parameter. As may be seen, the algorithm extends the elevation envelope 22' relative to that of FIG. 1A. The rectangular envelope 22 of FIG. 1A essentially has been skewed to now define in FIG. 1C, a parallelogram corresponding to each field period, asymmetrically centered about the nominal elevation 20. The loci of the lines 12', corresponding to the head elevation centers, are established by determining the extent that the tape has moved through a field, and by shifting the centering up or down as required, by an amount corresponding to the extent of the tape position into the field. Thus, in the example of FIG. 1C, if the head is one-sixth into the field with a one-third tracking error, then the head should be one-sixth down from the top of its scanning elevation, which here would place the center at the nominal elevation. When tape position is four-sixths through the field, the scanning elevation should be four-sixths of the minimum elevation of FIG. 1C, etc. Maintaining this relationship between scan elevation and tape position thus insures that the head jump decision occurs precisely at a field-to-field transition.

As may be seen, the head continually is being displaced more than in the prior art of FIG. 1A. In the technique of FIG. 1C, the scan tracking centering continuously is displaced from the nominal elevation, which requires the continuous application of more deflection current. This small disadvantage is acceptable given the preferred advantage of having the head jump coincide with the field transitions, such as depicted in FIG. 1C by the coincidence of the end and start of adjacent fields at 14' indicative of a head jump, with the vertical lines 16' indicative of a field-to-field transition. Note that this is only ±1 field of elevation in the worse case, where typical systems require ±1½ fields for the full play variable range of −1 to +3 times play speed.

Figure 2A:
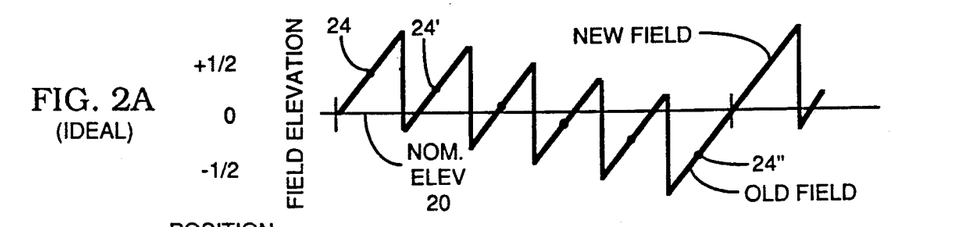
FIGS. 2A–2E are graphs depicting the scan tracking centering relative to time for an ideal tracking system (FIG. 2A), for the prior art (FIG. 2D) and for the invention (FIG. 2E), and including timing scales (FIGS. 2B, 2C).
Figure 2B:
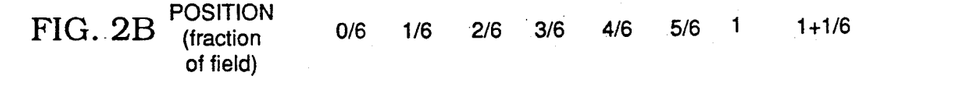
Figure 2C:
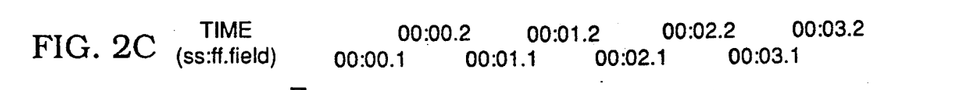

FIG. 2A depicts a plot of head elevation for a plurality of real time fields for an ideal scan tracking system, i.e., where there are no tracking errors. In this ideal case, both the traditional algorithm and the invention make the same centering decisions. FIGS. 2B, 2C, provide information regarding, respectively, the tape position as supplied by the tape timer capstan residual signal, and real time in seconds, frames, fields. At the beginning of a field at time 00:00.1 shown in FIG. 2C, the tape position is zero and since there is no tracking error, the head center elevation 24 is $+\frac{1}{2}$ from the nominal elevation 20. As is well known in the field of scan tracking, one-sixth play speed is obtained by jumping to repeat the same field six times, and then allowing the scan of a new field, thereby providing the slow motion effect. Due to the tape motion, the head center elevation for each repeated scan of the same field will drift, as at 24', downward in this example depicted in FIG. 2A, to a head center elevation 24" approaching the centering algorithm limit of head deflection. At this point, if the head were to attempt yet another jump it would exceed its centering limit. Therefore the associated algorithm causes the head to not jump at the end of the sixth field repetition, (time 00:03.1 in FIG. 2C), but to continue its normal scan into a new field.

Thus, at time 00:00.1 (FIG. 2C), corresponding to a zero position (FIG. 2B), the fraction of head deflection (point 24) is centered $+\frac{1}{2}$ of a full field of deflection (f), as shown in FIG. 2A. At time 00:00.2, the head deflection center, or center elevation 24', is one-third of the deflection f, and so on until at time 00:02.2 the head center elevation 24" is $-\frac{1}{2}$ and at the maximum negative deflection as determined by the associated algorithm. Thus at time 00:03.1 the head doesn't jump but continues onto a new field. Since there is no tracking error, the head jump decisions corresponding to off-tape field transitions occur in coincidence with the field-to-field transitions as indicated by the tape timer.

It should be noted that the head jumps one track to repeat the same field when moving in the forward direction. However, when moving in the reverse direction, as in reverse slow motion, the head must deflect twice as far, that is, perform a double field jump, to repeat the same field.

Figure 2D:
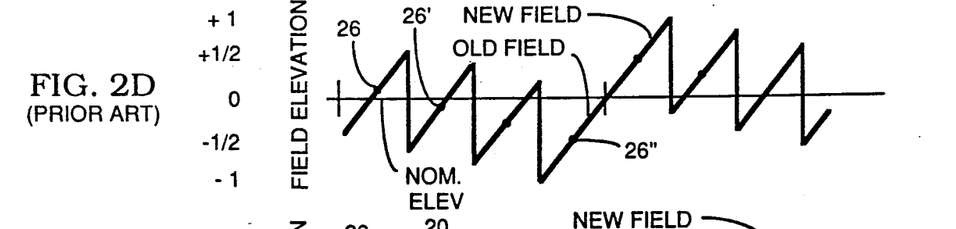
Figure 2E:
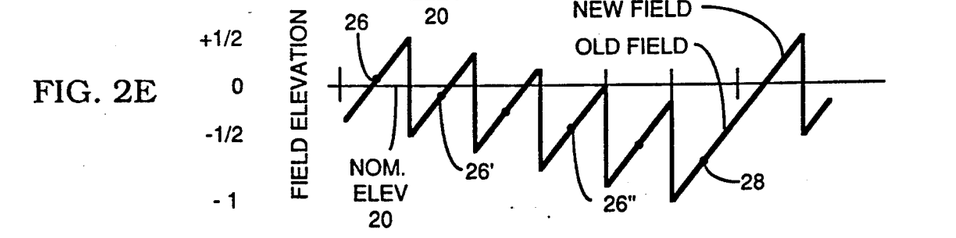

FIGS. 2D and 2E depict plots in real time of the head elevation over a plurality of real time fields, of the prior art and of the invention, respectively. As in the prior FIG. 2A, the graphs assume an operating parameter of one-sixth normal play speed, but now reflect a one-third of a field of tracking error, as do the graphs of FIGS. 1A, 1C. In fact, the graphs of FIGs. 1A and 2D of the prior art are directly related, as are those of FIGS. 1C and 2E of the invention.

In FIG. 2D, the one-third field of tracking error is accommodated by applying a one-third deflection to the head center elevation 26 relative to the ideal tracking situation (FIG. 2A), downward in this example, at the start of the first field scan. The head center elevations 26', etc., of subsequent field scans drift lower as described in FIG. 2A, until time 00:01.2 corresponding to the start of the fourth repetition. The algorithm determines that at 26" a further head deflection in the fifth scan beginning at time 00:02.1 would be excessive, that is, would require a head deflection exceeding $-\frac{1}{2}$ track relative to the ideal elevation 20. Accordingly, at the time 00:02.1 the head does not jump but is allowed instead to continue to scan into a new field.

However, due to the one-third field of tracking error, it may be seen that the head now is scanning a new field, but the time code would still be indicating the same previous field for the next two field scans from time 00:02.1 to 00:03.1. This causes the regions 18 of disagreement previously mentioned in FIG. 1A.

In accordance with the invention, FIG. 2E illustrates the effects of making the head deflection control responsive not only to head elevation, but also to the tape position information derived via the tape timer. With the one-third field tracking error, the head center elevations 26, 26'-26", through the first four scans are the same as those depicted in FIG. 2D. However, the invention algorithm provides the skewed and expanded centering envelope of previous description in FIG. 1C, wherein the optimal or ideal centering elevation also drifts downward. Thus, at the times 00:02.1 and 00:02.2, the head deflections of the respective scans are still within the deflection limit of $\pm\frac{1}{2}$ field relative to the ideal elevation (FIG. 2A). Accordingly, the head continues to jump to scan the same field until the head center elevation 28 prior to the start of a new field at the time 00:03.1. At this point, the algorithm determines that a further head deflection is excessive, and it allows the head to scan into the new field. Note that now the tape timer indicates a new field coincident with the transition to the new field.

Figure 3:
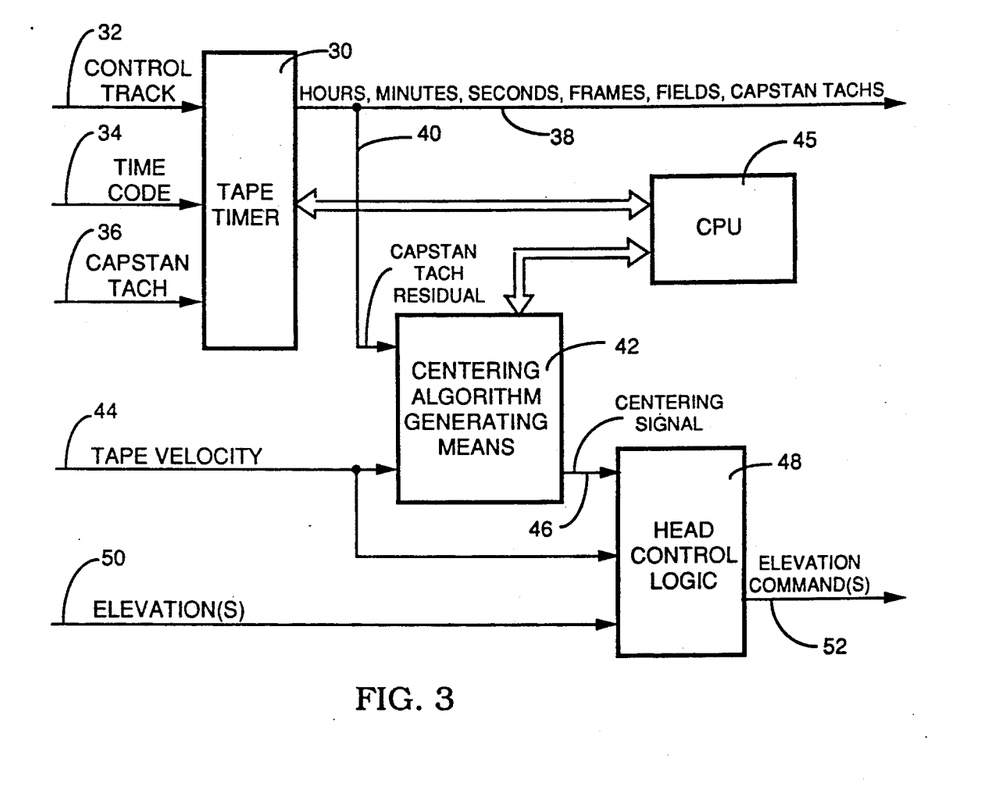
FIG. 3 is a block diagram which functionally depicts the scan tracking and tape timer combination of the invention, as may be employed in various non-segmented, segmented and/or instrumentation systems.

FIG. 3 depicts a functional block diagram of the invention in the environment of a tape timer system and scan tracking circuitry, as employed in a video tape recorder. An example of such a video tape recorder including conventional ramp deflection mechanism and an exemplary tape timer system and head jump logic, may be found in the Ampex Corporation VPR-3 video tape recorder described in the Operational Manual, 1809594-04, published February 1988 wherein, for example, Section 5 thereof includes a description of a scan tracking servo system typical of the environment in which the invention is operable, and which disclosure is hereby incorporated by reference.

In FIG. 3, a tape timer 30 is supplied with conventional signals on lines 32, 34, 36, namely, control track, time code and capstan tach signals respectively, as generally known in the art and illustrated, for example, in U.S. Pat. No. 4,692,819 to R. Steele, assigned to the same assignee as this application. The tape timer 30 in turn generates an output signal on a line 38 which represents tape position in terms of hours, minutes, seconds, frames, fields and capstan tach pulses. A capstan tach residual signal is extracted from the line 38 on a line 40, and is supplied to a centering algorithm generating means 42. The means 42 also receives via a line 44, a tape velocity signal which is indicative of the mode of operation and thus the speed at which the tape is moving. A microprocessor 45 herein is depicted as bidirectionally coupled to the tape timer 30 and centering algorithm generating means 42, and is integral therewith to provide the processing control and to generate, compute and store the data relevant to the algorithms.

The centering algorithm generating means 42, in accordance with the invention algorithm as processed by the microprocessor 45, generates a head centering signal on a line 46, which signal provides the adjusted scan tracking center elevations of FIGS. 1C and 2E, in response to the capstan tach residual signal and tape velocity, as determined by the algorithm defined by the relationship; centering $=\frac{1}{2}f-$capstan tach residual, if $-1/6 \leq$ velocity $\leq 1/6$, where f is a field of deflection corresponding to the track width, that is, the transverse distance between field tracks. A full field of deflection is depicted in FIGS. 1 or 2 as extending vertically from $-\frac{1}{2}$ track to $+\frac{1}{2}$ track. Two fields of deflection is depicted as extending from 0 to $\pm 1$ track.

The head centering signal is supplied to head control logic means 48, which also receives the tape velocity signal via the line 44 and a head elevation signal or signals via a line 50. In a non-segmented system, a head elevation signal is supplied, but in a segmented system, the plurality of heads supply a respective number of signals. The head elevation signal is supplied by a respective conventional head deflection measuring circuit (not shown) and as well known, reflects any existing tracking error. The head control logic means 48 generates a head elevation command on a line 52 in response to its input. FIGS. 2A and 2E would be typical. In a segmented system, multiple elevation commands are supplied via the line 52 to the respective plurality of heads.

Figure 4:
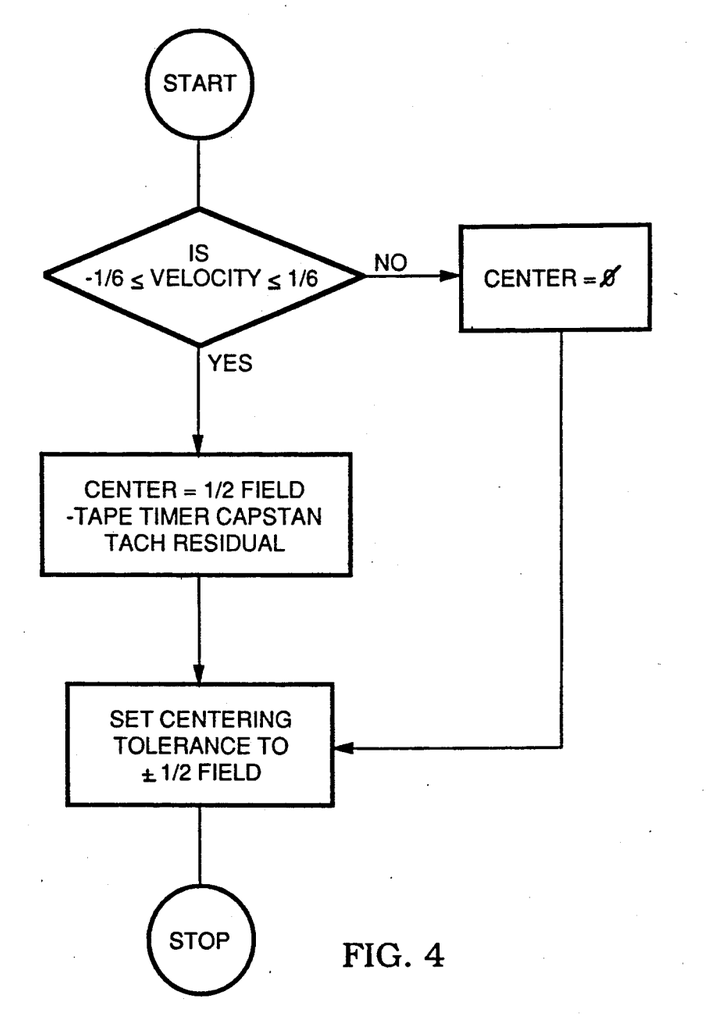
FIG. 4 is a flow chart of a software routine for continuously modifying the centering of the scan tracking process in response to the tape position in a field, or in an interval of helical data, derived by the tape timer.

FIG. 4 illustrates a software routine which cooperates with the apparatus of FIG. 3, to provide the skewed centering envelope of FIG. 1C and thus the adjusted scan tracking elevations of FIGS. 1C, 2E, to provide a head jump decision and thus any associated field transition, only at a tape timer field-to-field transition, in accordance with the invention. To this end, in the specific example described herein by way of example only, the centering algorithm generating means 42 begins the routine by inquiring if the tape velocity on line 44 is within the limits of $-1/6$ to $+1/6$ of stop. If yes, the routine continues by setting the center equal to $\frac{1}{2}$ the field minus the capstan tach residual signal supplied by the tape timer on the line 40. The centering tolerance then is set to plus or minus $\frac{1}{2}$ field and the routine is over.

In the event that the tape velocity is too high or too low, the center is set to the nominal elevation, or zero, as depicted in FIGS. 1A and 2D, and the routine continues by setting the centering tolerance to plus or minus $\frac{1}{2}$ field. The latter side routine corresponds to the traditional prior art algorithm and technique for controlling the scan tracking process.

Although the invention generally is described herein, by way of example only, in the velocity range $-1/6$ through $+1/6$, it is equally adaptable at speeds of the order of from $-1/6$ through $+2\ 1/6$, as prevously mentioned, as long as the head deflections remain within traditional scan tracking capabilites.

In addition, the invention contemplates use with segmented recording format systems, and/or instrumentation systems, as well as with the non-segmented video system described herein by way of illustration only. Thus, for example, in current digital video tape recorders, a single scan or "head pass" includes two tracks with dual azimuth heads that scan respective tracks with different azimuths. The recording format includes six tracks and three segments per single real time field. With such a segmented format, the decisions regarding whether to jump are made, not in coincidence with the ends of the real time fields, but are made a plurality of times during the field, i.e., at selected intervals of the field, which intervals are determined by the recording format; i.e., number of heads, number of segments per field, etc. However, in instrumentation recording systems, unlike video recording systems, the data are not arranged in fields. The data to be recorded are arranged instead in a logical grouping, or interval, of helical data which, however, may be recovered (as described above relative to fields recorded in respective tracks) with a traditional controllabe scan tracking head or heads on a respective track or tracks.

Thus, the invention contemplates use with segmented or non-segmented systems, wherein at least one scan tracking head scans contiguous helical data with preselected transitions therein, which define thus selected intervals of helical data, and wherein the data is recorded in one or more helical tracks in a recording tape medium. Accordingly, as intended herein a field is an example of an interval of helical data in a video system, while a logical grouping is an interval of helical data in an instrumentation system.

For purposes of illustration of the invention, the center elevations corresponding to the head scans have been selected herein in FIGS. 1A, and 1C to represent the head elevations as related to tape position in fields. Thus, the center field elevations represented in part by points 26—26" and 28 of FIGS. 2D and 2E are the field elevation lines 12 of FIGS. 1A, 1C, respectively. The ends of the scan could be used instead of the centers, however the centers are less affected by velocity and thus the use of centers of scans eases centering algorithm generating calculations.

I claim:

1. System for controlling a scan tracking head which scans contiguous helically recorded data with preselected fields therein, recorded in one or more helical tracks in a tape utilizing a tape timer signal indicative of tape position in a field, and a head elevation signal which also reflects any tracking errors, comprising:

means responsive to said tape timer signal for generating a centering signal indicative of the tape position in a field of the preselected fields; and means responsive to the centering signal and to said any tracking errors reflected in the elevation signal, for initiating a field transition only when the field transition coincides with a preselected transition of the tape timer signal regardless of the presence of said any tracking errors.

2. The system of claim 1 including:

means responsive to the tape movement for supplying a capstan tach signal indicative of the tape position in the field; and said generating means including means responsive to said capstan tach signal for generating a centering adjusting algorithm in accordance with, centering = ½f-capstan tach signal, where f is the distance between tracks.

3. System for controlling a scan tracking head in the presence of scan tracking errors, which head scans selected intervals of helically recorded data with associated transitions therein, which data are recorded in one or more tracks in a tape, comprising:

tape position means for supplying a type position signal indicative of the tape position in an interval of said selected intevals of helically recorded data;

head centering means responsive to said tape position signal, for modifying a centering of the scan tracking head commensurate with the tape position in the interval;

means for providing a head elevation signal which reflects said tracking errors experienced by the scan tracking head; and head control means responsive to said head centering means and to said tracking errors reflected in said head elevation signal, for initiating a head control decision when the tape position means indicates a transition between intervals of the helically recorded data regardless of the presence of said tracking errors.

4. The system of claim 3 wherein:

said interval of helical data comprises a logical grouping of helical data;

said tape position means supplies a tape position signal indicative of the tape position in the logical grouping; and said head centering means modifies the centering of the scan tracking head in response to the tape position signal.

5. The system of claim 3 wherein:

said interval of helical data comprises a field of video recorded in one or more tracks;

said tape position means supplies a tape position signal indicative of the tape position in the field; and said head centering means modifies the centering of the scan tracking head in response to the tape position signal.

6. The system of claim 5 wherein the tape position means includes:

means for providing control track and capstan tach signals; and means responsive to the control track and capstan tach signals, for supplying a capstan tach residual signal indicative of said tape position in the field.

7. The system of claim 6 wherein the head centering means includes:

means responsive to said capstan tach residual signal for generating a head centering signal indicative of said tape position.

8. The system of claim 6 including microprocessor means for generating the head centering signal in accordance with the algorithm, centering = ½f -capstan tach residual, where f is the distance between tracks, and where $-1/6 \leq$ velocity $\leq 2\ 1/6$ of normal play speed.

9. The system of claim 3 wherein the head centering means includes:

means for providing a tape velocity signal;

means responsive to the tape position signal and the tape velocity signal, for determining the value of the modified centering as determined by the relationship, centering = ½f-capstan tach residual, if $-1/6 \leq$ velocity $\leq 2\ 1/6$ of normal play speed, where f equals the distance between tracks.

10. The system of claim 9 wherein the determining means includes a microprocesser.

11. The system of claim 9 wherein the head control means is responsive to the value of the modified centering, to the tape velocity signal, and to an instantaneous elevation of the head.

12. A method for controlling a scan tracking head in the presence of tracking errors, which head scans selected intervals of helically recorded data in one or more tracks in a tape with preselected transitions between the selected intervals, comprising the steps of:

supplying a tape position signal indicative of the tape position in a respective interval of said selected intervals;

determining an optimum centering elevation for the scan tracking head in the absence of a tracking error;

adjusting the optimum centering elevation in response to the tape position signal to provide an adjusted centering elevation;

providing a head elevation signal which also reflects the presence of said tracking errors; and generating a selected head jump decision in response to the adjusted centering elevation and to said tracking errors only upon the occurrence of a transition of the preselected transitions regardless of the tracking errors.

13. The method of claim 12 wherein the intervals of helical data comprise fields of video;

said supplying step includes supplying a tape position signal indicative of the tape position in a field; and said generating step includes providing the selected head jump decision command in coincidence with a transition between fields.

14. The method of claim 13 wherein the supplying step includes providing in response to the tape position signal a capstan tach residual signal indicative of said tape position in a respective field.

15. The method of claim 14 wherein the adjusting step is performed in accordance with the algorithm, centering=½f-capstan tach residual, where f is the distance between tracks, and wherein $-1/6 \leq$ tape velocity $\leq 2\ 1/6$, and the values 1/6 through 2 1/6 are relative to normal play speed.

16. A method for controlling a scan tracking head which scans one or more selected tracks in a tape, using a tape timer signal indicative of the tape position in the field, comprising:

determining that the tape velocity is in the range of from $-1/6$ to $+2\ 1/6$ of normal play speed;

supplying a capstan tach residual signal indicative of said tape position in the field;

providing an adjusted centering value equal to one-half a field minus the capstan tach residual signal;

setting the tolerance of the adjusted centering value to plus or minus one-half field; and allowing a head jump control decision only when the tape position corresponds to the end of the field.

17. The method of claim 16 further including, allowing the head to continue to a new field in coincidence with a field transition indicated by the tape timer signal.

* * * * *